US006690317B2

(12) United States Patent
Szeto et al.

(10) Patent No.: US 6,690,317 B2
(45) Date of Patent: Feb. 10, 2004

(54) TERRAIN DATABASE BASED GROUND RETURN SUPPRESSION

(75) Inventors: Roland Y. Szeto, Seattle, WA (US); Bill G. Cornell, Bellevue, WA (US)

(73) Assignee: Honeywell International Inc., Morristown, NJ (US)

( * ) Notice: Subject to any disclaimer, the term of this patent is extended or adjusted under 35 U.S.C. 154(b) by 76 days.

(21) Appl. No.: 10/079,695

(22) Filed: Feb. 19, 2002

(65) Prior Publication Data

US 2003/0016155 A1 Jan. 23, 2003

Related U.S. Application Data

(60) Provisional application No. 60/306,194, filed on Jul. 17, 2001.

(51) Int. Cl.[7] .......................... G01S 13/95; G01S 13/00
(52) U.S. Cl. ........................ 342/26; 342/159; 342/175; 342/176; 342/180; 342/195
(58) Field of Search .................. 342/26, 159, 160–186, 342/195, 196, 197

(56) References Cited

U.S. PATENT DOCUMENTS

| | | | |
|---|---|---|---|
| 4,940,987 A | 7/1990 | Frederick | 342/26 |
| 5,059,967 A | 10/1991 | Roos | 342/26 |
| 5,202,690 A | 4/1993 | Frederick | 342/26 |
| 5,523,759 A | 6/1996 | Gillberg et al. | |
| 5,781,146 A | 7/1998 | Frederick | 342/26 |
| 5,828,332 A | 10/1998 | Frederick | 342/26 |
| 5,920,276 A | 7/1999 | Frederick | 342/26 |
| 5,945,926 A * | 8/1999 | Ammar et al. | 342/26 |
| 6,424,288 B1 * | 7/2002 | Woodell | 342/26 |

* cited by examiner

*Primary Examiner*—Bernarr E. Gregory
(74) *Attorney, Agent, or Firm*—Honeywell Int'l Inc.

(57) ABSTRACT

The present invention comprises a system, method, and computer program product for suppressing terrain returns in weather radar images. A weather radar display system includes a memory, a terrain database, a display, and a display processor coupled to the memory, terrain database, and the display. The display processor includes a first component configured to extract radar return data stored in the memory based on aircraft position, a second component configured to extract data stored in the terrain database based on aircraft position, and a third component configured to selectively accept or discards or otherwise segregates data for display based upon the data extracted from memory and the data extracted from the terrain database.

16 Claims, 5 Drawing Sheets

US 6,690,317 B2

TERRAIN DATABASE BASED GROUND RETURN SUPPRESSION

PRIORITY CLAIM

This application claims priority from the U.S. Provisional Patent Application No. 60/306,194, filed Jul. 17, 2001.

COPENDING APPLICATIONS

The following are copending applications and are hereby incorporated by reference: U.S. patent application Ser. Nos. 10/080,197, 10/080,180, 10/080,192 , now U.S. Pat. No. 6,597,305 ; and U.S. patent application Ser. No. 10/079,477, all filed on Feb. 19, 2002.

BACKGROUND OF THE INVENTION

Weather radar is a substantial aid for detecting adverse weather conditions that are hazardous to flying aircraft such as clear air turbulence, windshears, microbursts, and aircraft generated wake vortices. Pilots have exploited such radars to avoid these weather conditions, and due to the radars' capability of early detection, have done so with minimal impact upon the total flight time and distance.

In spite of the detailed information the radar returns present, it is still difficult to distinguish between terrain and hazardous weather. There are many types of surfaces that will produce nearly identical, and thus indistinguishable, radar returns. Wherever the terrain intrudes into the illuminated view of the weather radar, it, too, will return a radar signal. To the pilot, such returns might present themselves as weather or might act to confuse the display in a manner such that the ground clutter obscures a weather system that would present a danger to flight. Removing the "ground clutter" will allow the pilot to reliably discern the weather information contained within the radar returns.

Therefore, a method to suppress radar returns from terrain in weather radar would be useful.

SUMMARY OF THE INVENTION

The present invention comprises a system, method, and computer program product for generating various weather radar images allowing the suppression of terrain-based radar returns. A weather radar display system includes a memory, a terrain database, a display, and a display processor coupled to the memory, terrain database, and the display. The display processor includes: a first component configured to extract radar return data stored in the memory based on aircraft position; a second component configured to extract data stored in the terrain database based on aircraft position; and a third component configured to selectively accept or suppress data for display based upon the data extracted from memory and the data extracted from the terrain database. The resulting weather radar display portrays only the weather within the relevant airspace, the lower limit of which is defined by the known terrain features.

In accordance with further aspects of the invention, the first component extracts the radar return data from a three-dimensional buffer.

In accordance with other aspects of the invention, the three-dimensional buffer is also circular.

In accordance with still further aspects of the invention, the three-dimensional buffer is aircraft referenced in x and y and an altitude dimension is referenced to altitude above the earth and the first component translates the radar return data into the coordinate system of the three-dimensional buffer.

In accordance with still another aspect of the invention, the first component stores return data based on actual radar tracking or antenna pointing.

As will be readily appreciated from the foregoing summary, the invention provides an improved weather radar display system.

BRIEF DESCRIPTION OF THE DRAWINGS

The preferred and alternative embodiments of the present invention are described in detail below with reference to the following drawings.

DETAILED DESCRIPTION OF THE PREFERRED EMBODIMENT

Figure 1:
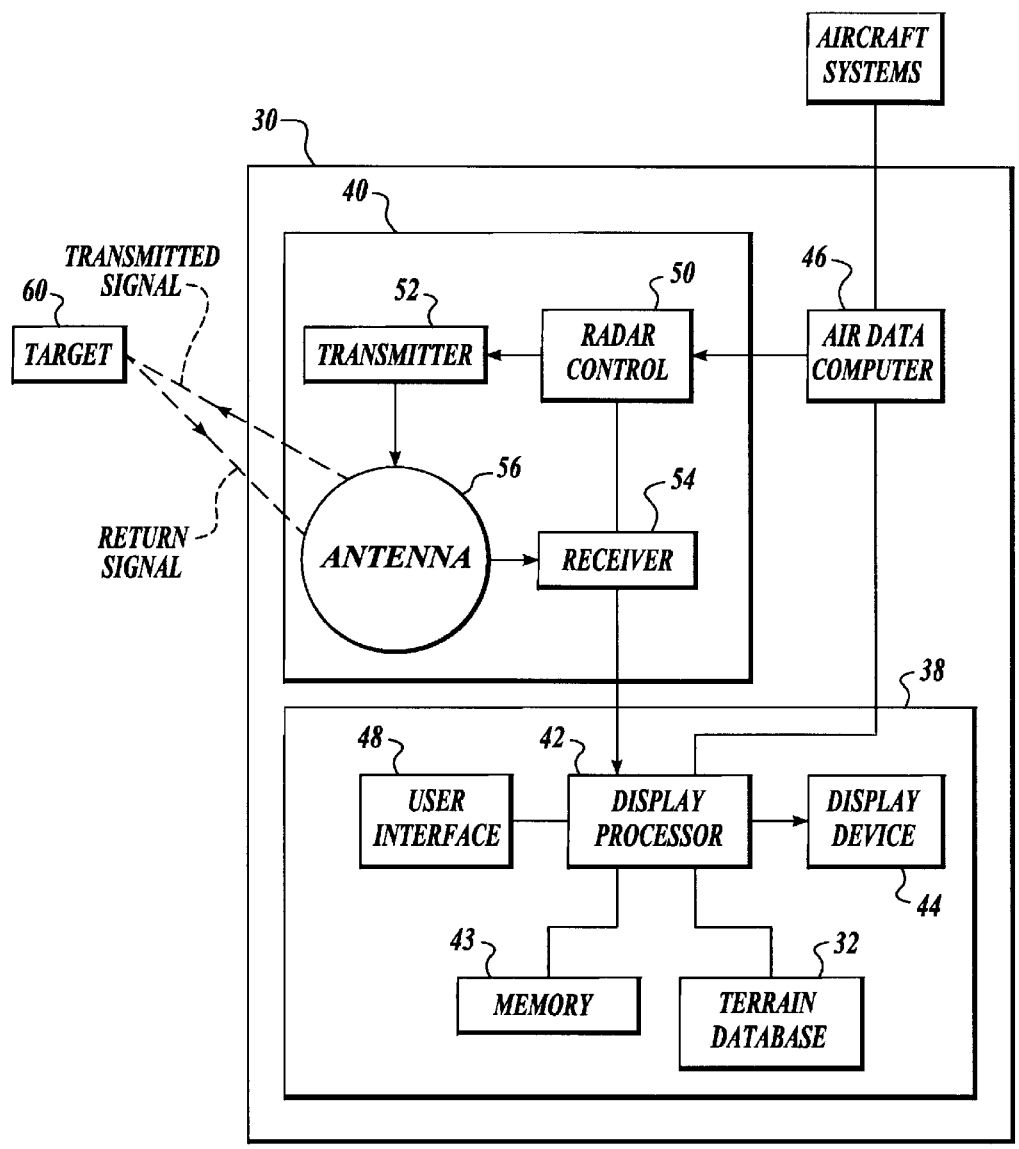
FIG. 1 is a block diagram illustrating components of the present invention.

The present invention is a system, method, and computer program product for providing improved radar return by suppressing terrain-based returns. FIG. 1 illustrates an example system 30 formed in accordance with the present invention. The system 30 includes a weather radar system 40, a display/interface front-end 38, and an air data computer 46. The display/interface front-end 38, includes a display processor 42, memory 43, a display device 44, a user interface 48, and a terrain database 32. An example of the radar system 40 includes a radar controller 50 (coupled to the user interface 48), a transmitter 52, a receiver 54, and an antenna 56. The radar controller 50 controls the transmitter 52 and the receiver 54 for performing the sending and receiving of signals through the antenna 56. The weather radar system 40 and the display/interface front-end 38 are electronically coupled to the air data computer 46.

Radar relies on a transmission of a pulse of electromagnetic energy, a signal. The antenna narrowly focuses the transmission of the signal pulse focused in comparison with the whole breadth of a desired downrange image. Like the light from a flashlight, this narrow signal illuminates any objects in its path and illuminated objects reflect the electromagnetic energy back to the antenna. A radar controller 50 calculates the distance of the object relative to the antenna based upon the length of time the transmitted signal pulse takes in the transition from the antenna to the object and back to the antenna. The relationship between distance and time is linear as the velocity of the signal is constant, approximately the speed of light in a vacuum.

Digital radars create inherently storable numeric images of downrange targets. In order to sense the passage of time, digital radars rely upon the radar control 50 monitoring the antenna in a series of discrete uniform sampling periods. The radar control 50 then calculates the distance from the antenna by counting the number of discrete periods passing before the moment of arrival of the reflected signal. The strength of the reflected signal during the sampling period is stored in association with the identification of the period to create a range bin. That range bin contains reflectivity data representative of a range of distances from the antenna corresponding to the time from the beginning to the end of the sampling period. These are termed range bins because the data reflects blocks of distance rather than discrete points.

With digital radar, the radar controller 50 associates the reflectivity data it receives with the corresponding range bin (range) and with the precise direction the target bears to the antenna. To derive the direction, when sending the signal pulse radial transmission, the radar controller 50 directs the antenna 56 at the target 60. By recording the precise position of the antenna at the time of transmission, the radar control 50 fixes the direction by elevation and azimuth. The air data computer 46 supplies the location in space of the antenna to the radar controller 50 by supplying very complete aircraft positional data. The air data computer 46 is tasked with deriving position information (i.e., position, heading, roll, yaw, pitch, etc.) from data received from a Flight Management System (FMS), Inertial Navigation System (INS), or a global positioning system (GPS). With the added information that the air data computer 46 imparts, the radar controller can accurately place the targets in three-dimensional space. In turn, the display processor 42 can take the accurately located targets and store the data defining their location in the memory 43, preferably a three-dimensional volumetric buffer where the absolute locations determine where the buffer stores the reflectivity values.

The display/interface front-end 38 allows the user to request one of several views of the data stored in the memory 43. The pilot-user may request, through the user interface 48, such ordering of the data into a data view as the pilot requires, such views might include, for example, a plan view of the weather, or the weather at an altitude of 30,000 feet. In accord with the pilot's requests, the user interface 48 generates control signals that it sends to the display processor 42. The display processor 42 recalls the reflectivity values from the appropriate locations relative to the current position of the aircraft and compiles the requested data view. The display processor 42 sends the selected data for presentation on the display device 44 based on settings within the video. U.S. Pat. No. 5,059,967 to Roos describes an apparatus and method for displaying weather information and is hereby incorporated by this reference.

The displayed reflectivity values or return data, as determined by the radar system 40 or processor 42, identify certain weather targets, such as rain/moisture, windshear, or turbulence. Each type of weather target has a characteristic pattern for radar reflection. The radar control 50 examines the reflectivity data by means of an algorithm for the purpose. To specify a particular sort of weather, the pilot enters the parameters of the weather of the desired type using the user interface 48. The display processor 42 executes a particular algorithm based on the entered parameters.

The pilot has the option to view the reflectivity values of all locations consistent with the pilot's request just as they are stored in the memory 43. More useful to the pilot is to selectively view the reflectivity values corresponding only to locations within an envelope whose lower extremity is the known terrain. To accomplish this, processor 42 will attenuate the pilot's request to include only those locations above the terrain. To accomplish this attenuation, the display processor 42 compares the locations consistent with the pilot's requests from the user interface 48, with the information stored in the terrain database 32. Within the terrain database 32 there exists a mathematical model of the terrain comprising altitude information stored in association with latitude and longitude for each discrete location. Where the terrain database 32 indicates the existence of terrain, at the position and altitude of a reflected radar signal the display processor 42 will not present reflectivity data for display.

It should be evident that the topology of the inventive device, as presented is not critical to its operation. For example, the elements of the display/interface front-end 38, a display processor 42, memory 43, terrain database 32 and a display device 44 might not exist in the star configuration displayed in FIG. 1. As likely, these components would exist on one or more busses that would allow interconnectivity of the elements as necessary to accomplish the functions described herein. The several described components would be separately addressable on the bus or busses.

Figure 2:
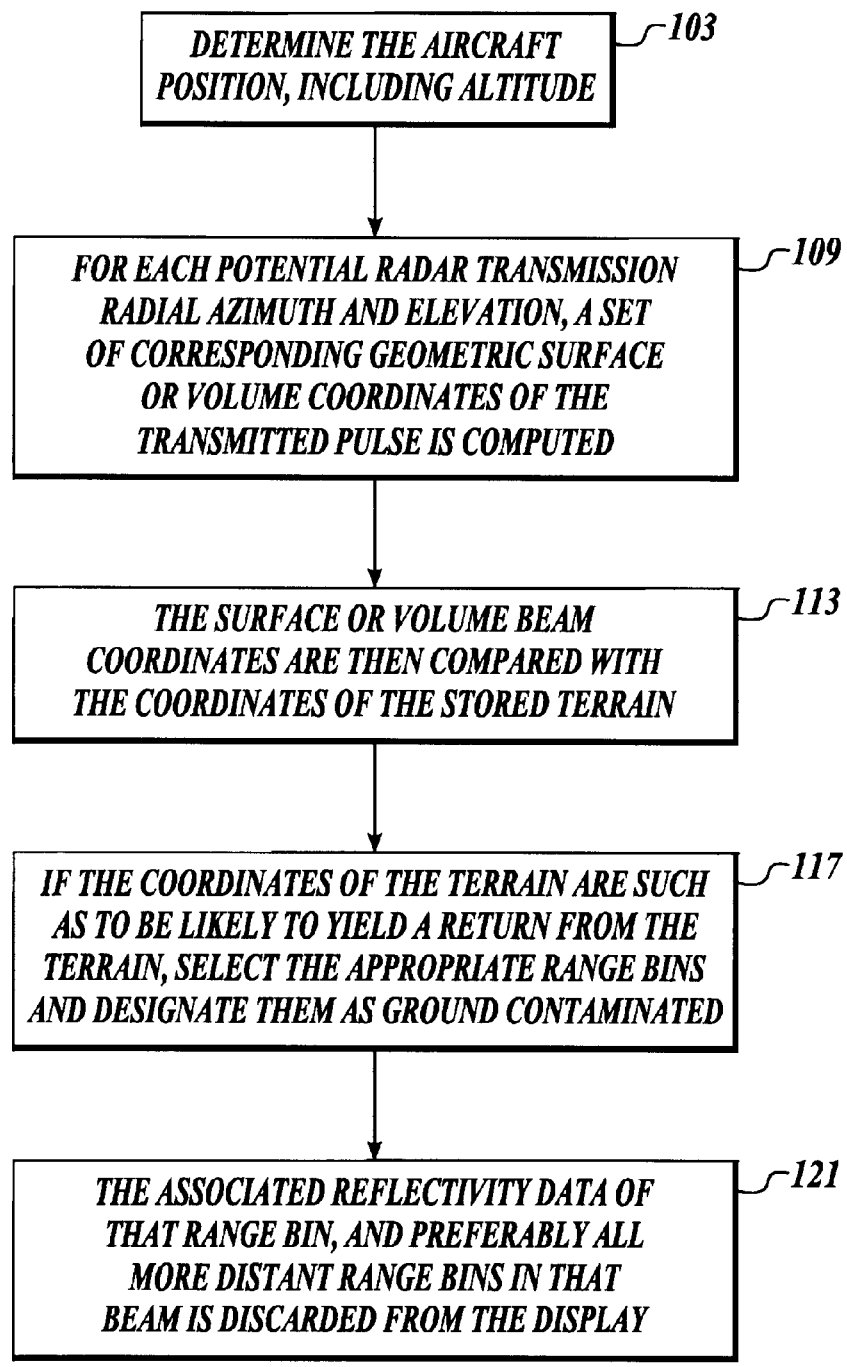
FIG. 2 is a flow diagram illustrating the process the inventive system, shown in FIG. 1, performs.

FIG. 2 illustrates an example process performed by the display processor 42 shown in FIG. 1. First, at block 103, the display processor 42 receives the positional aircraft data (i.e., position, heading, roll, yaw, pitch, etc.) from, a Flight Management System (FMS), Inertial Navigation System (INS), or a global positioning system (GPS).

At block 109, the display processor 42 projects the radial transmission cone of the narrow transmission signal, for each radial signal pulse transmission according to azimuth and elevation into real space. The exact location of illuminated space within each radial signal pulse transmission is necessary in order to translate a projection of the radial signal pulse transmission onto the stored mathematical model of the terrain stored in the terrain database 32, originating from the current position of the aircraft. At block 113, by comparing the real space coordinates of the terrain surface in the database 32, the display processor 42 is able to determine the points of intersection.

The calculations necessary to project the signal transmission in its cone-shaped propagation pattern over the stored terrain model in the terrain database 32 require elaborate trigonometry. However, those skilled in the art are well familiar with the equations allowing for correction for the curvature of radar rays due to atmospheric refraction in a normal atmosphere (*Radar Handbook* by Merrill Skolnik).

Given these equations, again at block 113, the display processor 42 extrapolates the projections of these cone-shaped transmission patterns to strike a stored model of the terrain surface at discrete points. The display processor 42 retrieves the terrain surface data from the terrain database 32 to perform this extrapolation. Through a quickly iterative process, the display processor 42 calculates the position in real space of an intersection of the projected cones and the modeled terrain.

Once display processor 42 calculates the position of the intersection points, the display processor 42 then calculates that position in terms of radar elevation, azimuth, and range bin. At block 117, the display processor 42 defines each of these intersections in terms of the spherical coordinate system elevation, azimuth, and range bin (a term explained below but corresponding to radius or radial distance from the aircraft). The air data computer 42 then classifies each of the intersection points as "ground contaminated" meaning that the reflections emanating from the intersection points are likely reflections from terrain obstacles.

At block 121, the display processor 42 segregates the data on any given radial between that reflectivity data emanating from locations that are proximal to the transmitter from the intersection and those distal. The reflectivity data emanating from points distal from the intersection point, including the range bin containing the intersection point, the display processor 42 suppresses. The display processor 42 only sends reflectivity data emanating from points proximal to the transmitter, between it and the intersection point, are then sent to the display device 44 for display.

In the preferred embodiment, this process becomes simpler. Because the preferred embodiment stores reflectivity data in a three-dimensional buffer, and because the buffer assigns storage locations in the memory 43 by virtue of the location the reflective surfaces in real space, the display processor 42 is not required to recalculate those locations in real space. In that embodiment, the display processor 42 may simply not display reflectivity data from any location containing terrain in the terrain database 32.

Figure 3:
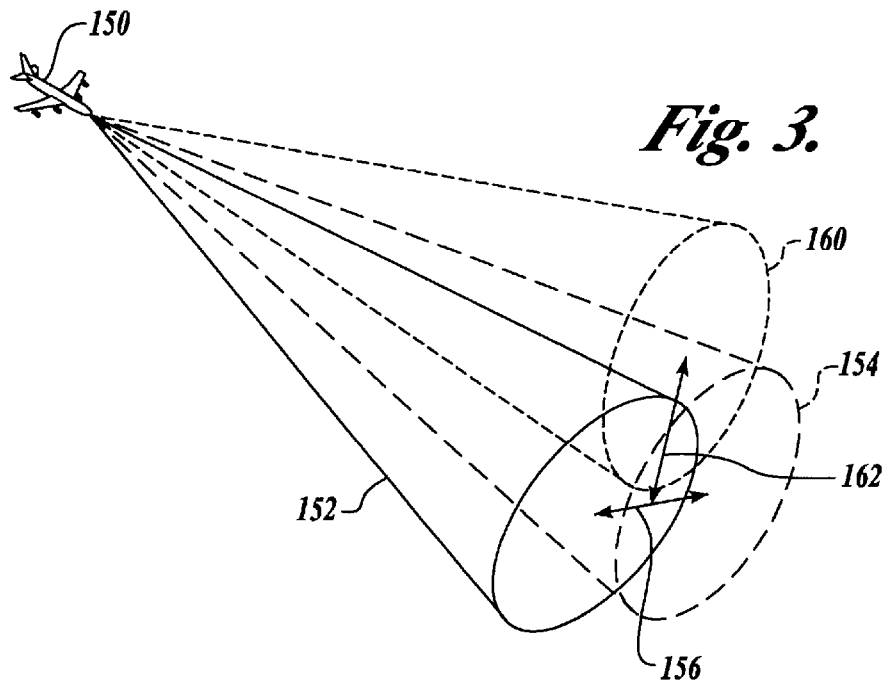
FIG. 3 is a perspective diagram of volumes of scanned space scanned by multiple radar signals emanating from an aircraft.

FIG. 3 illustrates a perspective view of an aircraft 150 displaying three radar signals propagating from the antenna 56 in conical volumes of space 152, 154, and 160 along different radials. As above, the radar control 50 or the display processor 42 defines each radial by azimuth and elevation. In the preferred embodiment, to cover the horizon, the radar control 50 sweeps the antenna 56 in sweeps that are parallel to the horizon; but the radar control 50 could execute sweeps vertically or by some other pattern.

Figure 4:
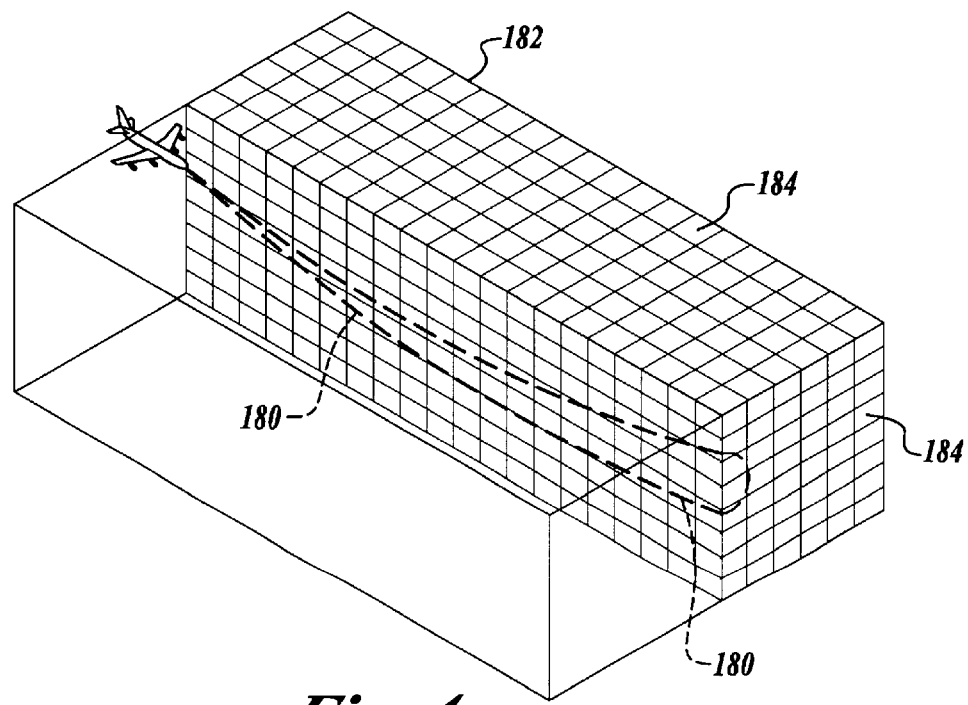
FIG. 4 is an abstract perspective diagram of how return from a single radar signal along a radial is mapped into a three-dimensional buffer.

As indicated above, the preferred embodiment of the invention uses a memory 43 configured as a three-dimensional buffer. As shown in FIG. 4, the radar control 50 translates the radar return data shown in volume 180 into locations within a three-dimensional buffer 182. Each address in the three-dimensional buffer 182 is termed a "volume cell" or voxel 188. Within the three-dimensional buffer 182, the display processor 42 stores the radar return data values (i.e., reflectivity measurement (dBs)) in coordination with locations within the volume 180.

Figure 5:
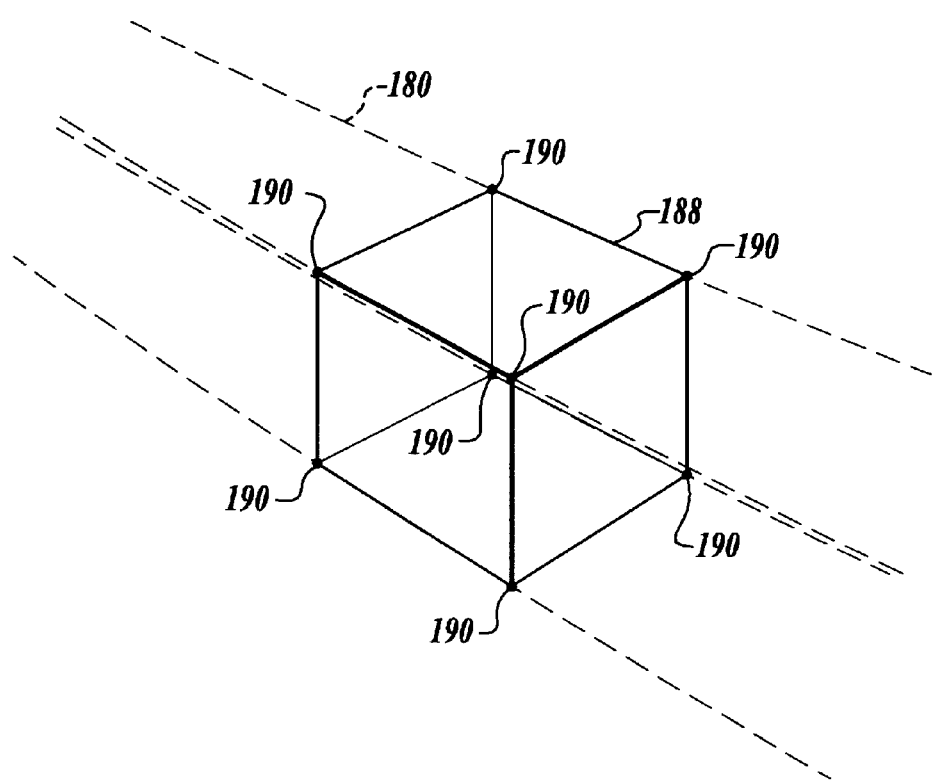
FIG. 5 is a perspective diagram of a single range bin that contains radar return data and a corresponding portion of voxels of the three-dimensional buffer.

FIG. 5 shows the boundaries of a single voxel 188. Since each range bin is small (radius of curvature of the bin is large relative to the range depth of the bin) and for real-time processing constraints, straight lines approximate the edges of the range bin. Because of the use of altitude as the third dimension of the volume 180 occupied by the radar return data, the resulting mapping of that data must be curved within the space as illustrated in order for the return data to be stored at the correct location relative to the curved earth. Alternatively, the processor may correct for the earth's curvature by considering the radar volume 180 as curved, as illustrated in FIG. 4.

A series of range bins correspond to each radial transmission, the radial, itself, defined by azimuth and elevation of the transmission relative to the absolute horizon, and to a distance. The term bin indicates that the particular bin indicates boundary values for the distance indicated by the timing of the reception of a particular radar echo. The discrete distances along the radial defined by the sampling interval of the reflected pulse.

In one embodiment, the three-dimensional buffer is a circular buffer. A circular buffer is a block of memory that has two associated pieces of data: a start index and an end index, both of which refer to certain index in the block of memory. Typically, circular buffers are used to implement queues, or FIFO (first-in, first-out) buffers. When a sample is enqueued in the circular buffer, it is stored at the location of the start index, and the start index is increased by one. When a sample is dequeued in the circular buffer, the value to which the end index points is returned, and the end index is increased by one. The buffer is called circular because when the start and end indices reach the logical end of the buffer, each index is simply reset to point to the first location in the buffer. Once the radar control 50 stores data from a corresponding range bin into the buffer, the data does not have to be copied again when the aircraft moves. Motion compensation of existing data is achieved by the simple act of moving the position reference of the aircraft relative to the buffer.

Where the selected display mode would include display of elements of the terrain, the inventive system would suppress display of such elements. By suppressing such elements in the generation of the display, the invention can be applied to any weather radar where the return data is stored either in association with a terrain location or in association with any particular radar transmission. With such an association, the process of segregating ground contaminated data from meaningful data will be based upon radials and range. Such a process follows.

Figure 6:
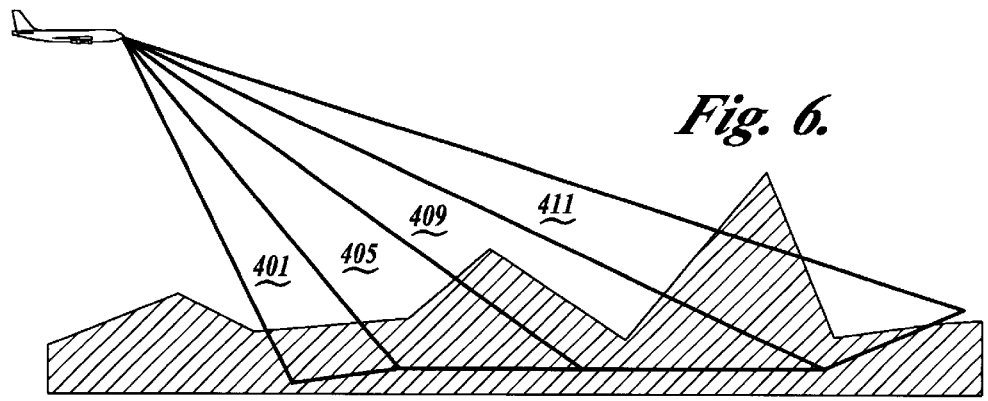
FIGS. 6–8 illustrate the suppression of terrain-based return information in accordance with the present invention.

FIG. 6 portrays the radial projection of sequential radar sweeps 401, 405, 409, and 411 in cross-section. Each of these sweeps projects a small aperture transmitted radar beam in discrete positions and monitors the return time for the reflected radar echo. Along radials 401 and 405, the terrain should yield a well-defined reflection, given the relative flatness of the surface intersecting the radials. Reflection of transmitted signals along radials 409 and 411 present distinct issues.

Transmission along radial 409 will produce at least two distinct echoes, as the transmitted beam will illuminate at least two distinct terrain surfaces. As neither of these reflections represents weather systems, the information is not merely unneeded but is confusing in its presence. Because weather detection is the principal purpose of the radar, elimination of both of the reflections will not degrade the effectiveness of the radar. The invention seeks to suppress these reflections.

Similarly, the transmission along the radial 411 does not accurately portray the precise configuration of the terrain. The alternating absence and presence of terrain along the radial 411 will not be detected by the radar as the first surface will effectively reflect the entirety of the transmission. To the radar along radial 411, the terrain appears as solid. Nevertheless, as along radial 409, the true contour of the terrain is surplus. Indeed, suppressing all of these terrain-based reflections will assist the radar in isolating weather systems.

Figure 7:
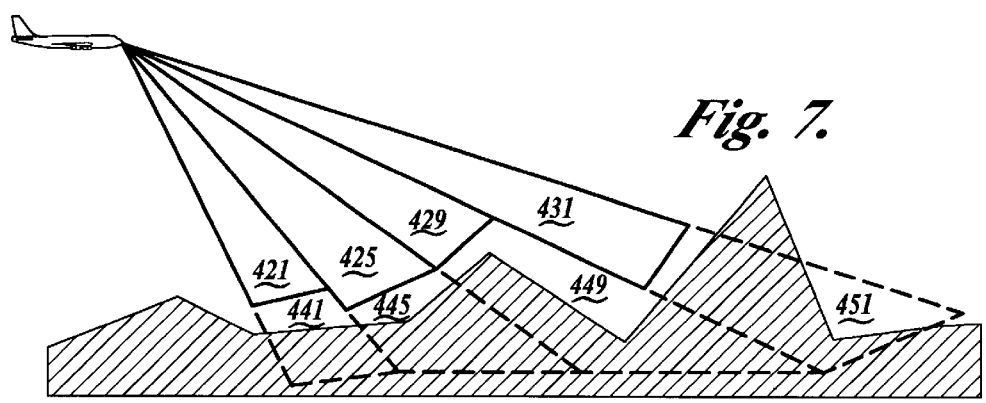

To effect the suppression of returns from terrain-based obstacles, the display processor 42, calculates the locations of the range bins for each radial where the radial projections 401, 405, 409, and 411 will meet the terrain model as stored in the terrain database 32. These range bins, the air data computer marks as "ground contaminated." For each radial, the display processor 42 segregates return data arriving before that from the ground contaminated range bin, from that arriving at the time at or later than that of the ground contaminated range bin. In alternate embodiments, the returns from the range bin or bins immediately preceding the ground contaminated range bin might also be grouped with the ground contaminated in order to enhance the suppression. What results is the segregation of the data from each radial into two distinct data sets, reflectivity data from the range bins proximal to the aircraft from the ground contaminated range bin and data from those distal. Hence in FIG. 7, data from radial 401, is segregated into data set representative of segments 421 and 441, radial 405, into segments 425 and 445, radial 409 into segments 429 and 449, radial 411 into segments 431 and 451.

Figure 8:
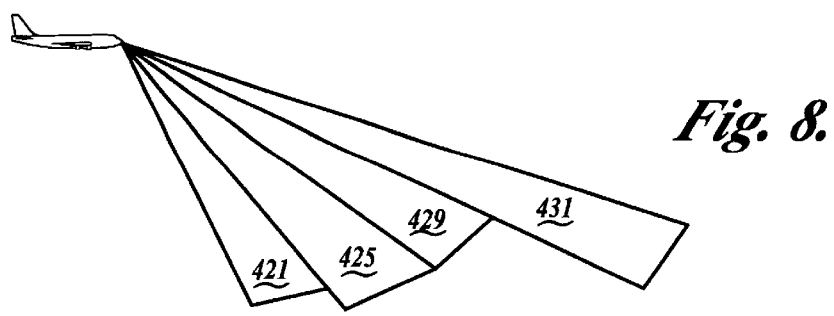

In order to display properly only the relevant weather, the display processor 42 will only generated data from the proximal segments as in FIG. 8. The remaining distal segments 441, 445, 449, and 451, the air data computer discards or otherwise segregates for additional analysis (such as map processing). Thus, the displayed weather is not obscured by the presence of terrain-based radar returns.

While the preferred embodiment of the invention has been illustrated and described, as noted above, many changes can be made without departing from the spirit and scope of the invention. Accordingly, the scope of the invention is not limited by the disclosure of the preferred embodiment.

The embodiments of the invention in which an exclusive property or privilege is claimed are defined as follows:

1. A weather radar display method comprising:

deriving an aircraft position;

recalling radar return data in a memory ordered in a manner based on aircraft position information;

extracting at least a portion of the data stored in the memory based on aircraft position information;

determining the portion of data stored in the memory that is contains ground clutter;

suppressing that portion of the data that is contains ground clutter and presenting the remaining data for display.

2. The method of claim 1, wherein the memory is a three-dimensional data buffer.

3. The method of claim 2, wherein the buffer is circular.

4. The method of claim 1, wherein determining the portion of data stored in memory that contains ground clutter is based upon the timing of radar returns.

5. The method of claim 1, wherein determining the timing of the radar returns comprises:

recalling from a terrain data base a terrain model based upon aircraft position;

projecting geometric surface or volume coordinates of a radar transmission onto the terrain model;

locating the intersection of the radar transmission and the terrain model in terms of range bins; and marking as containing ground clutter the range bin containing the intersection and all range bins distal of the range bin containing ground clutter for each radar transmission.

6. A weather radar display system comprising:

a memory;

a buffer for receiving an aircraft position;

a terrain database;

a display; and a display processor coupled to the memory, the database, and the display, the display processor comprises:

a first component configured to extract radar return data stored in the memory based on aircraft position information;

a second component configured to extract at least a portion of the data stored in the terrain database based on aircraft position information; and a third component configured to selectively accept and discard data for display based upon the data extracted from the memory and the data extracted from the terrain database.

7. The system of claim 6, wherein the memory is a three-dimensional buffer.

8. The system of claim 6, wherein the terrain database is in a ground proximity warning system.

9. The system of claim 6, wherein the terrain database is dedicated to the system.

10. The system of claim 6, wherein the third component comprises:

a first sub-component configured to project the location corresponding to the radar return data in memory onto the terrain model and locating points of intersection;

a second sub-component for correlating the radar return data in memory with a radial representing a single radar transmission;

a third sub-component for segregating the radar return data into segments proximal to the aircraft from the corresponding point of intersection and segments distal to the aircraft from the corresponding point of intersection for each radial;

a fourth sub-component for transmitting the segments proximal to the aircraft from the point of intersection to the display.

11. The system of claim 10, wherein the third sub-component assigns the corresponding point of intersection to the segment distal to the aircraft from the point of intersection.

12. A weather radar display computer program product encoded onto a computer-readable medium for performing a method comprising:

deriving an aircraft position;

recalling radar return data in a memory based on aircraft position information;

extracting at least a portion of the data stored in the memory based on aircraft position information;

determining the portion of data stored in the memory that is contains ground clutter; and presenting the remaining data for display.

13. The product of claim 12, wherein the memory is a three-dimensional buffer.

14. The product of claim 13, wherein the buffer is circular.

15. The product of claim 12, wherein the portion of the data that contains ground clutter is determined based upon timing of radar returns.

16. The product of claim 15, wherein determining the timing of the radar returns comprises:

recalling from a terrain data base a terrain model based upon aircraft position;

projecting geometric surface or volume coordinates of a radar transmission onto the terrain model;

locating the intersection of the radar transmission and the terrain model in terms of range bins; and marking the range bin that contains ground clutter containing the intetsection and all range bins distal of the range bin that contains ground clutter for each radar transmission.

* * * * *

UNITED STATES PATENT AND TRADEMARK OFFICE
CERTIFICATE OF CORRECTION

PATENT NO. : 6,690,317 B2
DATED : February 10, 2004
INVENTOR(S) : Szeto, Roland Y.

It is certified that error appears in the above-identified patent and that said Letters Patent is hereby corrected as shown below:

Column 7,
Lines 23 and 24, delete "is.".

Column 8,
Line 39, delete "is.".

Signed and Sealed this

Fourth Day of April, 2006

JON W. DUDAS
*Director of the United States Patent and Trademark Office*